(12) United States Patent
Falgayrettes et al.

(10) Patent No.: US 9,043,947 B2
(45) Date of Patent: May 26, 2015

(54) NEAR-FIELD OPTICAL PROBE MANUFACTURING USING ORGANO-MINERAL MATERIAL AND SOL-GEL PROCESS

(75) Inventors: Pascal Falgayrettes, Montpellier (FR);
Raphael Kribich, Montpellier (FR);
Laurent Nativel, Cournonterral (FR);
Bachar Mourched, Montpellier (FR);
Pascale Gall-Borrut, Pignan (FR);
Benoit Belier, Ville D'Avray (FR)

(73) Assignees: CENTRE NATIONAL DE LA RECHERCHE SCIENTIFIQUE, Paris (FR); UNIVERSITE MONTPELLIER 2 SCIENCES ET TECHNIQUES, Montpellier (FR)

( * ) Notice: Subject to any disclaimer, the term of this patent is extended or adjusted under 35 U.S.C. 154(b) by 0 days.

(21) Appl. No.: 13/979,274

(22) PCT Filed: Jan. 9, 2012

(86) PCT No.: PCT/EP2012/050208
§ 371 (c)(1),
(2), (4) Date: Jul. 11, 2013

(87) PCT Pub. No.: WO2012/095376
PCT Pub. Date: Jul. 19, 2012

(65) Prior Publication Data
US 2013/0298295 A1 Nov. 7, 2013

(30) Foreign Application Priority Data
Jan. 14, 2011 (EP) .................................... 11305043

(51) Int. Cl.
*G01Q 60/22* (2010.01)
*G01Q 70/14* (2010.01)
*G01Q 60/06* (2010.01)
*G01Q 60/38* (2010.01)
*B82Y 20/00* (2011.01)
*B82Y 35/00* (2011.01)

(52) U.S. Cl.
CPC ................. *G01Q 60/22* (2013.01); *B82Y 20/00* (2013.01); *B82Y 35/00* (2013.01); *G01Q 60/06* (2013.01); *G01Q 70/14* (2013.01); *G01Q 60/38* (2013.01)

(58) Field of Classification Search
CPC ....... G01Q 60/18; G01Q 60/22; G01Q 60/24; G01Q 60/38; G01Q 70/08; G01Q 70/10; G01Q 70/14
USPC ................. 850/24, 30–33, 40, 52, 56, 59, 60; 73/105
See application file for complete search history.

(56) References Cited

U.S. PATENT DOCUMENTS 6,144,795 A * 11/2000 Dawes et al. .................. 385/141
6,291,140 B1 * 9/2001 Andreoli et al. ............... 430/322

(Continued)

OTHER PUBLICATIONS

Coudray et al, "Integrated Optics Based on Organo-Mineral Materials", Materials Science in Semiconductor Processing 3 (2000) 331-337.*

(Continued)

*Primary Examiner* — Michael Logie
*Assistant Examiner* — David E Smith
(74) *Attorney, Agent, or Firm* — Greer, Burns & Crain, Ltd.

(57) ABSTRACT

A method is provided for manufacturing near-field optical probes including at least one organo-mineral material with an organic part and a mineral part, the method including steps of irradiating at least partially the organo-mineral material with a radiation beam to polymerize the organic part in the irradiated areas, and polycondensing the mineral part by sol-gel process. Also disclosed are near-field optical probes and AFM and SNOM systems using the probes.

19 Claims, 3 Drawing Sheets

(56) References Cited

U.S. PATENT DOCUMENTS

| | | | | |
|---|---|---|---|---|
| 6,408,122 | B1* | 6/2002 | Shimada et al. | 385/129 |
| 6,862,921 | B2* | 3/2005 | Chand et al. | 73/105 |
| 7,072,563 | B2* | 7/2006 | Shelnut et al. | 385/143 |
| 7,226,966 | B2* | 6/2007 | Kambe et al. | 524/432 |
| 7,901,784 | B2* | 3/2011 | Kuramoto et al. | 428/447 |
| 2007/0211986 | A1* | 9/2007 | Niwa et al. | 385/13 |

OTHER PUBLICATIONS

Kim et al, "Photoplastic Near-Field Optical Probe with sub-100 nm Aperture Made by Replication from a Nanomould", Journal of Microscopy, vol. 209, pt 3 Mar. 2003 pp. 267-271.*

Kim, G.M. et al, "Photoplastic Near-Field Optical Probe with Sub-100 nm Aperture Made by Replication from a Nanomould", Journal of Microscopy, vol. 209, Mar. 2003, pp. 267-271.

Sturmer, H. et al, "Microstructured Polymer Tips for Scanning Near-Field Optical Microscopy", Ultramicroscopy, vol. 71, 1998, pp. 107-110.

Gall-Borrut, P. et al, "Silicon Technology-Based Micro-systems for Atomic Force Microscopy/Photon Scanning Tunnelling Microscopy", Journal of Microscopy, vol. 202, Apr. 2002, pp. 34-38.

Coudray, P. et al, "Integrated Optics Based on Organo-Mineral Materials", Materials Science in Semiconductor Processing vol. 3, 2000, pp. 331-337.

International Search report from PCT application No. PCT/EP2012/050208; Feb. 17, 2012.

European Search Report from EP application No. 11305043.9; May 26, 2011.

* cited by examiner

NEAR-FIELD OPTICAL PROBE MANUFACTURING USING ORGANO-MINERAL MATERIAL AND SOL-GEL PROCESS

FIELD OF THE INVENTION

The present invention relates to a method for manufacturing near-field optical probes. It also relates to near-field optical probes devices and to scanning near-field optical microscopes (SNOM) and atomic force microscopes (AFM) systems using the device.

The field of the invention is the near-field microscopy with local probes.

BACKGROUND

According to the Rayleigh criterion, the lateral resolution which can be obtained with classical optical microscopy techniques is limited to about half the optical wavelength, which corresponds to about 250 nm in the visible optical wavelength range.

In order to overcome this limitation, several techniques have been developed, such as the atomic force microscopy (AFM), the scanning tunneling microscopy (STM), and the near-field optical microscopy, usually called SNOM for "Scanning Near-field Optical Microscopy".

Near-field optical microscopy allows reaching resolutions in the order of hundreds of nanometers or even tens of nanometers, and studying objects with dimensions smaller than the wavelength. It also makes it possible to obtain simultaneously optical density images and 3D topology images of the surface of the object. It finds for instance applications in physics and biology research.

The key element in near-field optical microscopy is an optical probe which comprises a tip and, at the end of the tip, an optical aperture with dimensions in the order of tens of nanometer. The probe is positioned with the optical aperture very close to the surface of the object under measurement, at a distance down to a few nanometers or even in contact. At such distance a coupling by evanescent optical fields appears between the object and the probe, which is the basis of the measurement.

The spatial resolution is determined by the size of the optical aperture of the probe rather than by the wavelength of the light as in classical optical microscopy: the SNOM technique allows imaging features with size comparable to the size of the aperture of the probe.

An image representative of the coupling can be obtained by scanning the surface of the object with the probe. During the scanning, the height of the probe relative to the surface of the object (or at least a control parameter) is usually maintained as much as possible constant by means of a closed loop control system driving for instance a piezo actuator which moves the probe. The 3D topology image of the object surface can be obtained from these probe displacements.

In addition to imaging, the technique allows interacting with the surface of an object or even manipulating it.

Measurements can be done essentially in two modes: an illumination mode or a collection mode.

In illumination mode, light is emitted by the probe whose optical aperture behaves as a local source of evanescent waves. These waves are diffracted by the patterns of the object whose size is comparable to the size of the optical aperture of the probe, producing propagating waves which propagate through the object and can be detected.

In collection mode, the object is illuminated by propagating optical waves outside the probe, usually through the object. These waves are diffracted by the patterns at the surface of the object, causing evanescent fields to appear in the vicinity of these patterns. The evanescent waves produced by patterns with a size comparable to the size of the optical aperture of the probe can couple into it, producing propagating waves into the probe tip which can be detected.

The probes are currently basically of the fiber type or of the cantilever type.

The probes of the fiber type consist essentially in an optical fiber. The end of the fiber, constituting the probe itself, is sharpened (for instance using a wet etching process) to form a conical tip with a radius of curvature at its extremity down to a few tens of nanometers. The extremity of the tip is the optical aperture. The tip, except the optical aperture, is usually metalized. These probes represent by far (about 80%) the majority of the probes used in commercially available SNOMs. They can be used in collection mode and in illumination mode, and have transmission coefficients in the order of $10^{-4}$. They are usually based on silica glass fibers, which are a quite cheap material. The fabrication technique is simple but rather adapted to low-volume or unit production. Its reproducibility is quite low, with as a result a quite large dispersion in the product specifications. In addition, these probes are very fragile.

The probes of the cantilever type comprise a hollow tip or a tip in light-transmitting material held by a cantilever. The extremity of the tip forms an optical aperture with a diameter in the order of 100 nm. These probes are similar to those used in Atomic Force Microscopy (AFM). The ones which are currently commercially available can only be used in illumination mode. The transmission coefficient of the nano aperture is in the order of $10^{-4}$. These probes are usually fabricated by batch process, using photolithography and others silicon wafer processing techniques in use in microelectronics. So the optical and mechanical specifications of the cantilever probes show much less dispersion than the specifications of the fiber probes. And, because of their geometry, these are also less fragile.

In contrast with the fiber type probes, the probes of the cantilever type offer interesting possibilities for the integration of passive or active optical functions on the cantilever, so as to turn them to MOEMS (Micro Opto Electro Mechanical System). Several publications have been made on that topic, proposing the use of various materials, various fabrication techniques and various kinds of functions and components. For instance, materials such as silicon, silicon oxide, silicon nitride, InP, and integration of components such as waveguides, Schottky detectors, VCSEL laser diodes have been proposed.

We know for instance the paper from P. Gall-Borrut, B. Belier, P. Falgayrettes, M. Castagne, C. Bergaud, P. Temple-Boyer, "Silicon technology-based micro-systems for atomic force microscopy/photon tunnelling microscopy", Journal of Microscopy, Vol. 202, Pt 1, April 2001, pp. 34-38, which discloses a probe of the cantilever type featuring a cantilever in silicon nitride (SiNx) which acts as a waveguide. The cantilever is bounded to a photodetector on a holder side opposite to the tip, with the waveguide guiding light between the tip and the photodetector.

Up to now however, the integrated optical functions remain very basic and do not extend far beyond interconnection of sources and/or detectors with the tip. In particular, no elaborated passive functions such as wavelength de-multiplexing or filtering have been done efficiently.

Reasons for that may be found in the materials used and the fabrication techniques, which are interdependent:

The probe materials must be compatible with the design of planar optics waveguide of complex shapes for instance, which is not the case of all the materials used;

The fabrication techniques used with materials such as silicon, when based on photolithography or similar techniques, involve very high production costs and, to be acceptable, high-volume production. So they are not compatible with low-volume or on-demand production of probes featuring specific functions.

Attempts have been made to design optical probes of the cantilever type using polymer materials and much less expensive fabrication techniques.

We know for instance the paper from H. Stürmer, J. M. Köhler, T. M. Jovin, "Microstructured polymer tips for scanning near-field optical microscopy", Ultramicroscopy, vol. 71, 1998, pp. 107-110 which discloses a AFM/SNOM cantilever made in PMMA (Polymethylmethacrylate). The tip is also made in polymer and includes a fluorescent dye. However, the device do not feature any light guiding structure.

In another hand, we know techniques using sol-gel organo-mineral materials which are used for the realization of integrated optical circuits. The organo-mineral material is deposited on a substrate such as a silicon wafer, and optical structures such as waveguides are realized through a local polymerization process using UV light exposure, which also modifies locally the index of refraction. Components are then connected to optical fibers for interfacing. The technique is used for instance for manufacturing telecom optical components or chemical sensors.

It is an object of the invention to provide a method for manufacturing AFM/SNOM probes allowing the integration of elaborated passive and/or active optical functions on the probe.

It is also an object of the invention to provide a manufacturing process of such probes allowing versatility and flexibility in the design of the probes and low production costs at low volumes.

SUMMARY

Such objects are accomplished through a method for manufacturing near-field optical probes comprising at least one organo-mineral material with an organic part and a mineral part, characterized in that it comprises steps of:

irradiating at least partially the organo-mineral material with a radiation beam to polymerize the organic part in the irradiated areas, polycondensing the mineral part by sol-gel process.

The method of the invention relies on the use of organo-mineral materials comprising mixed organic parts and mineral parts, and able to polymerize, for the mineral part by sol-gel process, and for the organic part by a polymerization process triggered by an exposure to a radiation beam. These materials are already known and used for the realization of optical functions based on planar optical waveguides techniques, but in the prior art they are always used in the form of layers deposited on substrates such as silicon. In particular, their mechanical properties have never been exploited to build stand alone tridimensional structures such as near-field optical probes.

It is an advantage of the invention to have identified that some of these organo-mineral materials have interesting mechanical properties which make them very efficient for the design of MOEMS devices such as near-field optical probes of the invention, which are tridimensional devices and which have to comply also with mechanical specifications and constraints.

It is another advantage of the invention to have designed a fabrication process which allows large degrees of freedom simultaneously in the design of integrated optical functions, and in the mechanical and geometrical design of the probe.

The mineral part of the material can be solidified by polycondensation, using a sol-gel process. This process has the advantage to allow manufacturing materials with mechanical and optical properties similar to glass in non modified atmosphere and moderate temperatures (110° C.).

The radiation beam (which is the beam for irradiating the organo-mineral material) may comprise at least one of the following: an ultraviolet light beam, an electron beam.

The organic part of the material can be polymerized by illumination with an ultraviolet light beam, for instance issuing from a UV laser. The polymerization induces a local modification of the optical index of refraction. This modification may be an increase of the index of refraction, and allows designing light guiding structures such as planar optical waveguides.

A similar effect can be obtained by irradiating the organic part of the material with an electron beam.

The method of the invention may further comprise steps of:
providing a mold,
depositing a layer of organo-mineral material dissolved in a solvent on said mold,
irradiating at least partially the layer of organo-mineral material with a radiation beam to polymerize the organic part in the irradiated areas,
removing the areas of the layer in which the organic part is not polymerized by rinsing said layer with a solvent.

The solvent may comprise at least one of the following products: alcohol, acetone, benzene.

The method of the invention may be based on a casting process, in which a mold is used to shape the probe. Casting allows production of batches of probes with reproducible specifications at low cost. Compared to processes using crystalline silicon, the cost of the material is less, and the production process does not require specific environments and expensive techniques such as classical photolithography, so the production costs can also be maintained lower. In addition, the size of the batch may be more easily adapted to the production of small amounts of probes with specific or on-demand characteristics.

Once deposited on the mold, the solution of organo-mineral material may evolve towards a gel with the evaporation of the solvent and the polycondensation of the mineral part.

The irradiation with a radiation beam may be used to trigger the polymerization of the organic part in specific areas so as to define or draw optical, light-guiding and/or mechanical structures.

The parts in which the organic part is not polymerized may be removed using a rinsing product such as an alcohol as long as the polycondensation of the mineral part is not complete.

According to some modes of realization, the method of the invention may further comprise a step of depositing a layer of organo-mineral material on the mold over previously deposited and polymerized layers of organo-mineral materials.

In that way, devices comprising several layers of organo-mineral materials and/or layers comprising several materials and/or a layer capable of being partially polymerized and/or polymerized in several steps/way may be realized. The materials may be chosen so as to have different indices of refraction in order to build optical structures whose shape is different from the overall geometrical structure, such as for instance waveguides comprising a guiding part with a higher index of refraction surrounded by a material with a lower index of refraction.

According to some modes of realization, for manufacturing near-field optical probes comprising a cantilever and a tip located substantially toward an end of the cantilever, the method of the invention may further comprise steps of:

providing a mold comprising a substantially flat surface and hollow patterns substantially matching shapes of tips, irradiating with a radiation beam, on the layer of organo-mineral material previously deposited, the areas corresponding to the probe cantilevers.

So the irradiated areas may define the shape of the cantilevers.

The layer of organo-mineral material may be deposited using at least one of the following methods: a spin-coating method, a dip-coating method.

Such methods allow depositing a layer of organo-mineral material of substantially uniform thickness, which defines the thickness of the completed cantilevers.

The method of the invention may further comprise at least one of the following steps:

locally irradiating the layer of organo-mineral material with a radiation beam and moving said beam and said layer relative to each other to irradiate the desired areas of said layer, applying a mask on said layer and globally irradiating said layer through said mask with a radiation beam.

In the first case, the radiation beam may be substantially focused on the layer while in the second case it may be a broad beam, not necessarily converging or spatially coherent, and covering large parts.

The radiation beam may be an ultraviolet light beam, in which case the irradiation (or the illumination) can be done for instance with a HeCd laser with a wavelength of about 325 nm, or a YAG laser with a wavelength of about 266 nm. Moving the laser allows "writing" the optical structures on the layer, which allows for instance the realization of on-demand or specific structure without having to realize a mask first.

The radiation beam may be an electron beam generated for instance by a thermionic source or a field electron emission source, and focused by electrostatic and/or magnetic lenses. In the same way, moving the electron beam relative to the layer allows "writing" the optical structures on the layer.

The method of the invention may further comprise a step of completing the polycondensation of the mineral part by applying a thermal treatment. So the optimal mechanical characteristics may be obtained.

It may also further comprise a step of collecting the probes from the mold using one of the following methods:

eliminating the mold by etching said mold, made of silicon, using a reactive-ion etching technique, removing probes from the mold, said mold being coated with a coating comprising PTFE (Teflon®) and gold, or gold, to prevent adherence.

So when coated with an appropriate coating, the mold may be used several times, which substantially helps reducing the cost of the process.

According to another aspect, the invention comprises a near-field optical probe device, characterized in that it comprises at least one organo-mineral material with an organic part and a mineral part, said organic part being able to be polymerized using irradiation with a radiation beam, and said mineral part being able to be polycondensed using a sol-gel process.

The radiation beam may comprise at least one of the following: an ultraviolet light beam, an electron beam.

According to some modes of realization:

the device of the invention may comprise a cantilever and a tip located substantially towards an end of said cantilever, and planar optical waveguide features able to transmit light from and/or to the tip through the cantilever, said optical waveguide features comprising organo-mineral materials whose organic part is polymerized;

the optical waveguide features may comprise features being shaped so as to fulfill passive optical functions;

the passive optical functions may comprise at least one of the following functions: light guiding, coupling between optical waveguides, wavelength multiplexing, wavelength separation, and wavelength filtering.

The cantilever may have the geometrical shape required for the light-guiding structure, in which case light confinement is obtained using for instance lower refractive index of the surrounding air (or a coating). In the simplest configuration, the whole cantilever may for instance be used as a waveguide for guiding the light from and/or toward the tip.

Using well-known planar optics waveguides techniques which are fully applicable with the invention, passive optical functions may be designed for instance by implementing waveguides with specific shape, radius of curvature, length, index of refraction, . . . and with specific features such as bifurcations, star couplers, gratings . . . .

The functions integrated on the cantilever may include light guiding and wavelength separation and/or wavelength filtering, which allows replacing a separate spectrometer and doing spectral imaging.

The device of the invention may comprise an organo-mineral material with an organic part comprising a methacrylate or an epoxy functional group.

The device of the invention may comprise an organo-mineral material with a mineral part comprising a silanol group, such as for instance epoxycyclohexylethyltrimethoxysilane (EETMOS).

According to some modes of realization, the device of the invention may further comprise a tip comprising an organo-mineral material including at least one of the following: fluorescent dye, enzyme.

So the tip may be functionalized to be sensitive to specific biological, chemical or physical interactions and allowing transducing (or translating) them in optical signals. This opens way to many applications in biology for instance.

It is an advantage of the invention to allow including specific molecules in the organo-mineral material. Thanks to the low temperature process, these inclusions undergo little degradations during the fabrication. The tip may then be done in a separate step from the cantilever itself, and in a different material.

According to some modes of realization, the device of the invention may further comprise at least one of the following features:

a layer of metal deposited on a part of the tip and/or on at least a part of the cantilever, which may allow improving the light guidance efficiency and reducing the losses;

a light source and/or a light sensor tied to the end of the cantilever opposite to the tip, and optically connected to said tip through said cantilever;

a cantilever comprising a material and/or a structure (such as for instance a Bragg grating) electrically and/or optically sensitive to deformation and/or stress, so as to integrate pressure monitoring functions on the probe;

a cantilever comprising a piezoelectric material, so as to integrate pressure monitoring and/or motion functions on the probe.

Hybrid coupling with for instance light sources or detectors is made possible because of the non-aggressive manufacturing conditions.

The probes of the invention have several advantages compared to existing devices:

they may be used in illumination and/or in collection mode, and so they are the first probes of the cantilever type which may be used in collection mode;

The fact of integrating functions, optical or mechanical, directly on the probe allows suppressing several adjustments, which makes the use much easier for operators which are not optics specialists;

Thanks to the lower cost, it is possible to envisage single use or disposable probes, for instance to avoid contamination problems in biology, or artifact problems because of wear and ageing in physics;

According to another aspect, the invention may comprise a scanning near-field optical microscope (SNOM) system comprising a near-field optical probe of the invention.

According to another aspect, the invention may comprise an atomic force microscope (AFM) system comprising a near-field optical probe of the invention.

A probe of the cantilever type is indeed similar to a probe used on an AFM. An optical probe of the invention featuring integrated optical functions may be adapted much more easily than prior art devices to an existing AFM to add near-field optical measurements capabilities to the system.

DESCRIPTION OF THE DRAWINGS

The methods according to embodiments of the present invention may be better understood with reference to the drawings, which are given for illustrative purposes only and are not meant to be limiting. Other aspects, goals and advantages of the invention shall be apparent from the descriptions given hereunder.

DETAILED DESCRIPTION

Figure 1:
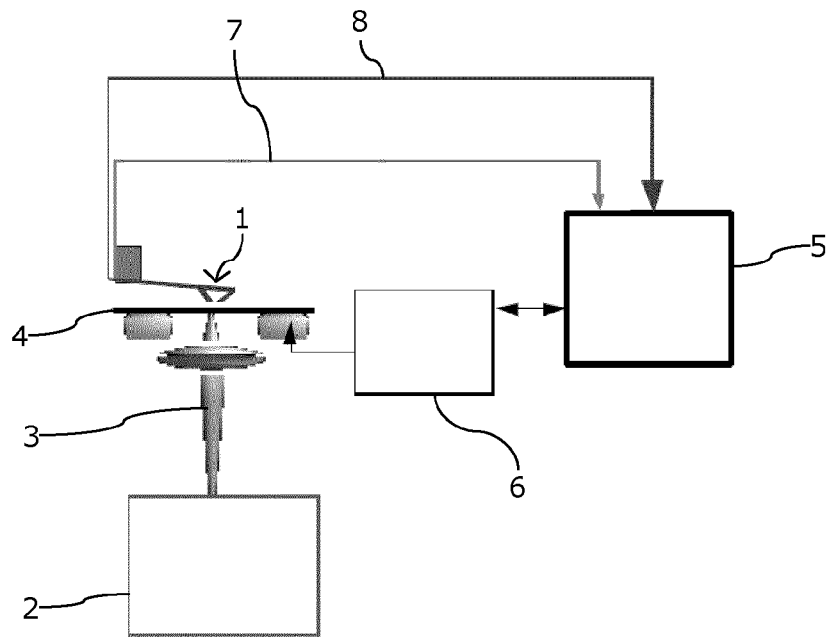
FIG. 1 shows a scanning near-field optical microscope (SNOM) system comprising a near-field optical probe of the invention used in collection mode.

With reference to FIG. 1, a scanning near-field optical microscope (SNOM) system used in collection mode comprises a light source 2 of the laser type, which emits a light beam 3 illuminating a sample 4 by transparency. A near-field optical probe 1 of the invention is placed on the side of the sample 4 opposite to the light beam 3, and couples to evanescent waves appearing at the surface of the sample 4. The light collected by the probe, or the optical signal 8, is fed to a detection unit and a computer 5 which controls the system. The probe 1 is applied on the sample 4 with a predefined constant pressure. This pressure is measured by measuring the flexure of the probe 1, for instance by means of an optical system placed on its side opposite to the sample 4. This pressure measurement 7 is also fed to the computer 5. A scanner unit 6, controlled by the computer 5, allows moving the sample 4 in-plane relative to the probe 1 in order to scan the surface of the sample with the probe 1, and controlling the vertical (out of plane) displacement of the probe 1 so as to maintain the pressure 7 on the sample 4 relatively constant. Measurements results can be provided at least in the form of an intensity map calculated from the optical signal 8 and a topography map calculated from the vertical displacements of the probe 1.

Figure 2:
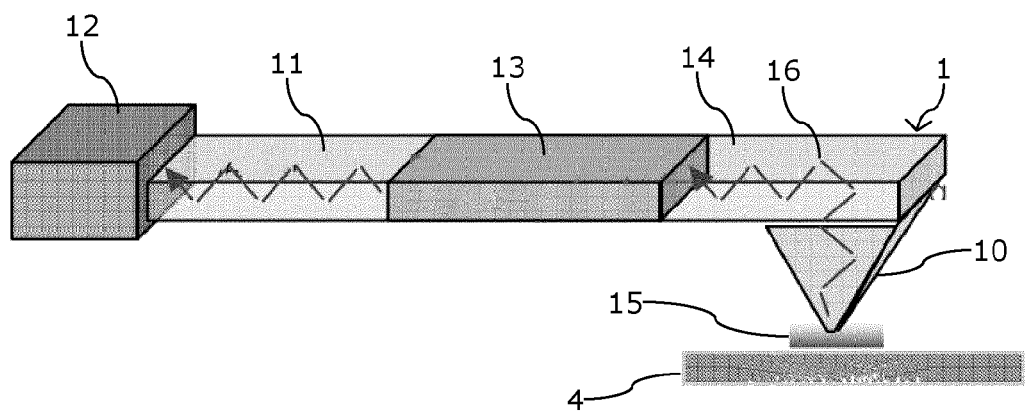
FIG. 2 shows a near-field optical probe of the invention.

With reference to FIG. 2, the probe 1 of the invention comprises a tip 10 of a substantially conical shape, a cantilever 11 and a holder 12. The probe 1 is fixed and connected to the microscope system by the holder 12. The pressure exerted by the tip 10 on the surface of the sample 4 is measured by measuring the flexure of the cantilever 11. The extremity of the tip 10 forms an optical aperture which couples with evanescent waves 15 at the surface of the sample 4. The tip 10 and the cantilever 11 comprise organo-mineral materials parts substantially transparent to light. The evanescent waves 15 collected by the optical aperture give rise to propagating optical waves 16 which propagate into the tip 10 and the cantilever 11 of the probe 1, toward the holder 12 and the detection means.

In a mode of realization, the cantilever 11 is dimensioned so as to behave as a planar optical waveguide for the light. The confinement of the propagating optical waves 16 within the cantilever 11 is obtained by the fact that the index of refraction is higher inside the cantilever 11 than in the surrounding air, and by the dimensions.

Optical passive functions are integrated on the cantilever 11 directly by means of specific design of parts 13 of the cantilever 11.

Figure 3:
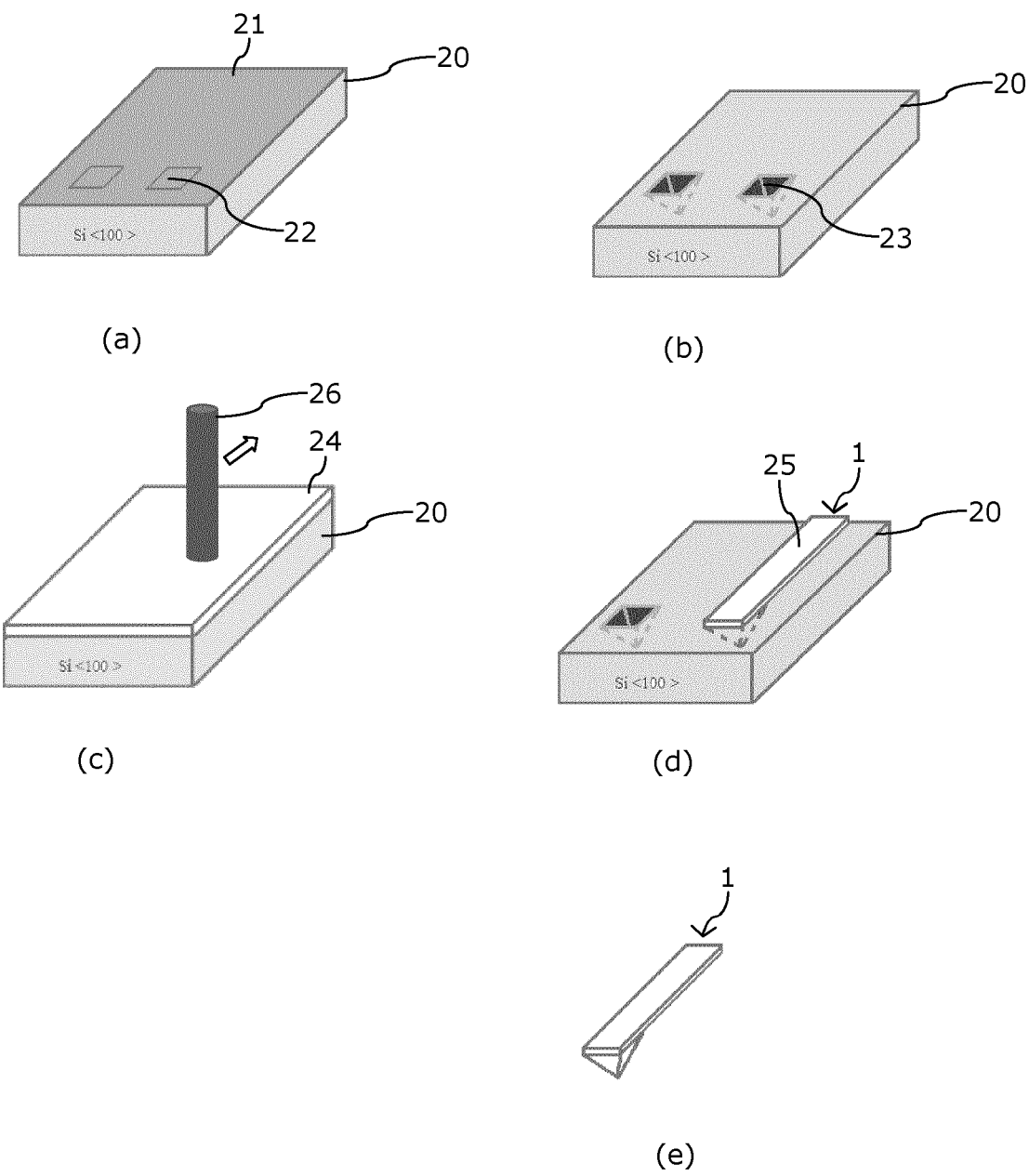
FIG. 3 shows an overview of the manufacturing process of the probe of the invention, steps (a) and (b) being related to the manufacturing of the mold, and steps (c), (d) and (e) being related to the manufacturing of the probe.

With reference to FIG. 3, the probe of the invention is manufactured using a casting technique.

In a first step illustrated in FIG. 3(a) and FIG. 3(b), the mold 20 itself is manufactured. The mold 20 is made of silicon. It is conveniently a classical silicon wafer of a few inches diameter, as used in microelectronics. It is first coated with a masking layer of photoresist 21. The locations 22 of the probes tips are removed from the masking layer 21 by light exposure and etching of the photoresist. The prints 23 of these tips are then etched in the silicon using a wet etching technique, and the resin layer 21 is removed. Several prints 23 are etched on a mold 20 so as to be able to manufacture several probes in one batch.

In a second step illustrated in FIG. 3(c) to FIG. 3(e), the probe 1 is manufactured using the mold 20. First, a solution of organo-mineral materials dissolved in a solvent is applied on the mold surface 20 by spin coating, so as to form a layer 24 of substantially uniform thickness. The material used comprises epoxy links for the organic part. A moderate heating is applied so as to evaporate the solvent partially and let the material evolve to a gel with the beginning of the polycondensation of the mineral part. The shapes of the cantilevers are then "drawn" on the layer 24 by illuminating the corresponding areas with the beam 26 of a YAG laser with a wavelength of about 266 nm. The beam is focused into the layer 24 and moved so as to trigger the polymerization of the organic part of the material. The layer 24 is then rinsed with an alcohol which dissolves the parts where the photo polymerization has not taken place. This is possible because the polycondensation process is not complete. Remain on the surface the parts 25 corresponding to the cantilevers 11. The shape of the cantilevers 11 as drawn by the laser beam are the shapes which are required for the waveguides 14 and the implemented passive functions 13.

The process of depositing a layer 24 of organo-mineral material, polymerizing parts 25 with the laser beam 26 and removing the non-polymerized parts may be repeated several times to build complex structures, or to embed optical structures 13, 14 in a protecting material of different index of refraction, so that to make cantilevers 11 with a geometrical shape different from the geometry of the optical part.

Once this process is completed, or between the steps of deposition of the layers 24, a heating step is applied in order to complete the polycondensation reaction and bring to the probe 1 its optimal mechanical resistance.

The probe 1 is removed from the mold 20 by eliminating the mold using a RIE (reactive ion etching) process.

As an alternative, the mold surface 20 may be coated with gold and PTFE to lower the surface adherence before using it. The probes 1, once finished, may then be removed and the mold 20 reused.

The probe 1 is then metalized on the cantilever 11 and the tip 10 (except the optical aperture) to improve the transmission of light.

Figure 4:
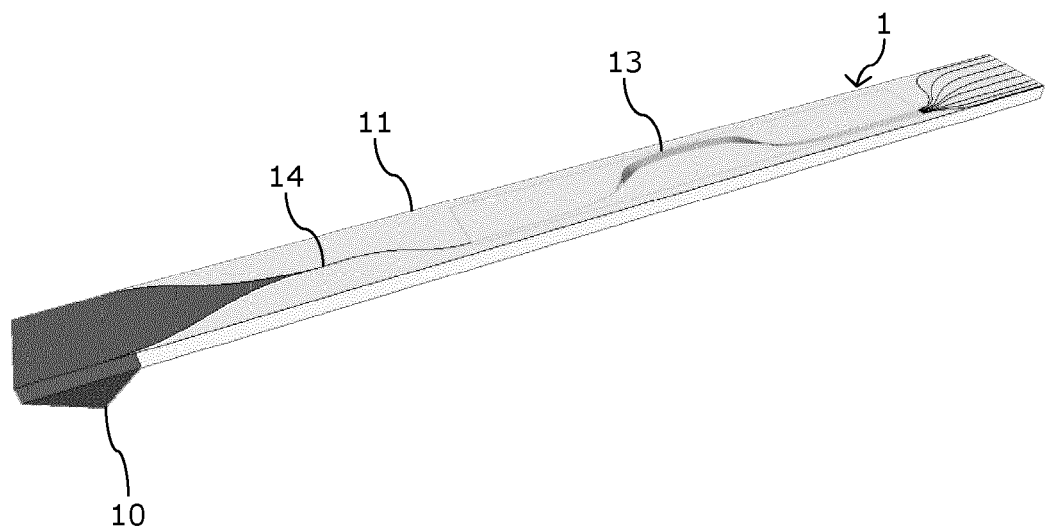
FIG. 4 shows a near-field optical probe of the invention comprising a optical wavelength demultiplexer.
Figure 5:
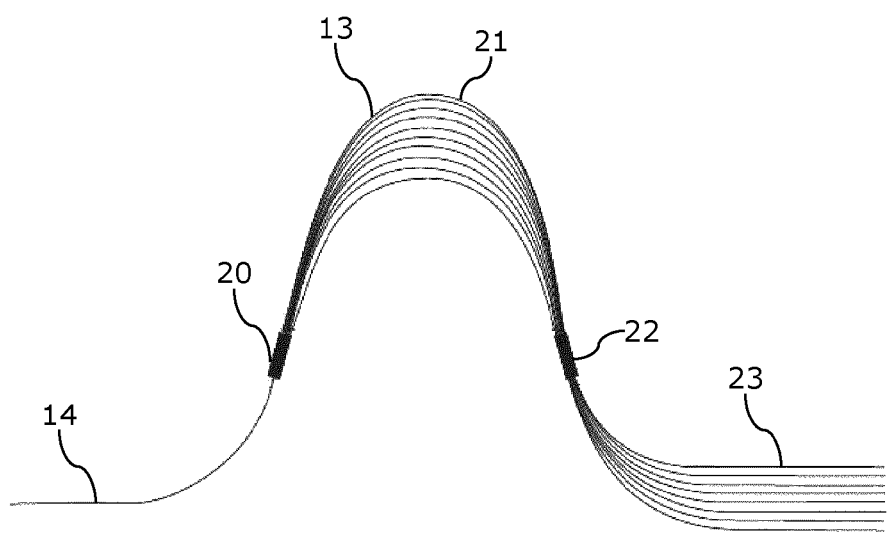
FIG. 5 shows a detailed view of the optical wavelength demultiplexer.

FIG. 4 and FIG. 5 show an example of probe 1 including a frequency demultiplexing component 13 on the cantilever 11. The figures do not intend to be on-scale. Such probe allows separating the spectral components of the optical signal directly at the probe level. A first waveguide 14 brings the light from the tip 10 where it has been collected to the demultiplexer 13. The demultiplexer 13 is shown in details in FIG. 5. It is based on a well known design technique. The incoming light is splitted into several channels 21 by a first star coupler 20. The channels 21 have different path length and recombine in a second star coupler 22. The light originating from the channels 21 interfere and combine in the second star coupler 22 so that, thanks to phase conditions, to split into separate spectral components, each coupling into a separate output channel 23.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for manufacturing near-field optical probes, each probe having a cantilever, comprising the steps of:
   irradiating at least partially an organo-mineral material with a radiation beam to polymerize an organic part in the irradiated areas;
   polycondensing a mineral part by a sol-gel process; and
   forming a tip having the organo-mineral material with the organic part and the mineral part, said tip being solid and integral with said cantilever.

2. The method of claim 1, characterized in that the radiation beam comprises at least one of the following: an ultraviolet light beam, an electron beam.

3. The method of claim 1, characterized in that it further comprises steps of:
   providing a mold;
   depositing a layer of organo-mineral material dissolved in a solvent on said mold;
   irradiating at least partially the layer of organo-mineral material with a radiation beam to polymerize the organic part in the irradiated areas; and
   removing the areas of the layer in which the organic part is not polymerized by rinsing said layer with a solvent.

4. The method of claim 3, characterized in that it further comprises a step of depositing a layer of organo-mineral material on the mold over previously deposited and polymerized layers of organo-mineral materials.

5. The method of claim 3, characterized in that, the tip is located substantially toward an end of the cantilever, it further comprises steps of:
   providing a mold comprising a substantially flat surface and hollow patterns substantially matching shapes of tips; and
   irradiating with a radiation beam, on the layer of organo-mineral material previously deposited, the areas corresponding to the probe cantilevers.

6. The method of claim 3, characterized in that it further comprises at least one of the following steps:
   locally irradiating the layer of organo-mineral material with a radiation beam and moving said radiation beam and said layer relative to each other to irradiate the desired areas of said layer; and
   applying a mask on said layer and globally irradiating said layer through said mask with a radiation beam.

7. The method of claim 3, characterized in that it further comprises a step of completing the polycondensation of the mineral part by applying a thermal treatment.

8. The method of claim 3, characterized in that it further comprises a step of collecting the probes from the mold using one of the following methods:
   eliminating the mold by etching said mold, made of silicon, using a reactive-ion etching technique; and
   removing probes from the mold, said mold being coated with a coating comprising PTFE (Teflon®) and gold, or gold, to prevent adherence.

9. The method of claim 1, wherein an index of refraction is higher inside said cantilever than in ambient air.

10. The method of claim 1, wherein said cantilever and said tip are totally transparent to light.

11. A near-field optical probe device having a cantilever, comprising: a tip having an organo-mineral material with an organic part and a mineral part, said tip being solid and integral with said cantilever, said organic part being able to be polymerized using irradiation with a radiation beam, and said mineral part being able to be polycondensed using a sol-gel process.

12. The device of claim 11, wherein the tip is located substantially toward an end of said cantilever, characterized in that it further comprises planar optical waveguide features able to transmit light from and/or to the tip through the cantilever, said optical waveguide features comprising organo-mineral materials whose organic part is polymerized.

13. The device of claim 12, characterized in that the optical waveguide features comprise features being shaped so as to fulfill passive optical functions.

14. The device of claim 13, characterized in that the passive optical functions comprise at least one of the following functions: light guiding, coupling between optical waveguides, wavelength multiplexing, wavelength separation, and wavelength filtering.

15. The device of claim 13, characterized in that the passive optical functions comprise at least one of the following functions: coupling between optical waveguides, wavelength multiplexing, wavelength separation, and wavelength filtering.

16. The device of claim 11, characterized in that it comprises an organo-mineral material with an organic part comprising a methacrylate or an epoxy functional group and a mineral part comprising a silanol group.

17. The device of claim 11, characterized in that it further comprises at least one of the following features:

a tip comprising an organo-mineral material including at least one of the following: fluorescent dye, enzyme;

a layer of metal deposited on a part of the tip and/or on at least a part of the cantilever;

a light source and/or a light sensor tied to the end of the cantilever opposite to the tip, and optically connected to said tip through said cantilever;

a cantilever comprising a material and/or a structure electrically and/or optically sensitive to deformation and/or stress; and a cantilever comprising a piezoelectric material.

18. A scanning near-field optical microscope system, characterized in that it comprises a device according to claim 11.

19. An atomic force microscope system, characterized in that it comprises a device according to claim 11.

\* \* \* \* \*